United States Patent [19]

Berger et al.

[11] 3,869,277
[45] Mar. 4, 1975

[54] HERBICIDAL COMPOSITION AND METHODS

[75] Inventors: Julius Berger; David Pruess, both of Passaic; James Parnell Scannell, Bloomfield, all of N.J.

[73] Assignee: Hoffman-La Roche Inc., Nutley, N.J.

[22] Filed: May 16, 1973

[21] Appl. No.: 361,013

[52] U.S. Cl. ................................................. 71/113
[51] Int. Cl. ............................................. A01n 9/20
[58] Field of Search ....................................... 71/113

[56] References Cited
UNITED STATES PATENTS 2,965,635  12/1960  Moore et al. .......................... 71/113
3,751,459  8/1973  Berger et al. .......................... 71/113

Primary Examiner—Elbert L. Roberts
Assistant Examiner—Catherine L. Mills
Attorney, Agent, or Firm—Samuel L. Welt; Bernard S. Leon; William G. Isgro

[57] ABSTRACT

Compositions possessing post-emergence herbicidal activity and contain as the active ingredient L-trans-2-amino-4-(2-aminoethoxy)-3-butenoic acid or acid addition salts thereof are described.

2 Claims, No Drawings

HERBICIDAL COMPOSITION AND METHODS

DETAILED DESCRIPTION OF THE INVENTION

The present invention relates to novel post-emergent herbicide compositions containing as the active ingredient L-trans-2-amino-4-(2-aminoethoxy)-3-butenoic acid or acid addition salts thereof. L-trans-2-amino-4-(2-aminoethoxy)-3-butenoic acid and its use as an antimicrobial and anthelmintic agent are described in our co-pending U.S. Pat. application Ser. No. 198,449 filed Nov. 11, 1971 now U.S. Pat. No. 3,751,459. The compound has the following structure:

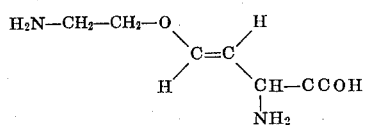

The compound of formula I is produced by a new species of Streptomyces, Streptomyces sp. X-11085. This new streptomycete was isolated from a soil sample collected in Arlington, California. A viable culture of the organism labelled with the laboratory designation Streptomyces sp. X-11085 has been deposited in the Northern Utilization Research and Development Division, Agriculture Research Service, United States Department of Agriculture in Peoria, Illinois, where this culture has been added to the NRRL collection under Registration No. NRRL 5331. The species of Streptomyces described herein and identified as Streptomyces sp. X-11085 includes strains of Streptomyces which produce the compound of formula I and which cannot be definitely differentiated from the strain NRRL 5331 and its sub-cultures including mutants and variants. By the term "mutants" as used herein there is intended mutants produced from the described organism by various means such as chemical mutagenic agents, ultraviolet radiation, x-radiation, phage exposure and the like. The properties of the compound of formula I are described herein and after these properties are known it is easy to differentiate the strain producing this compound from others.

The following is a general description of the organism Streptomyces sp. X-11085, NRRL 5331, based upon characteristics such as amount of growth, pigment, morphology etc. The descriptive colors and color chips designations are generally those recommended by the International Streptomyces Project (ISP): Shirling E. B. and D. Gottlieb, 1966, "Methods for Characterization of Streptomyces Species," Intl. J. Systematic Bact. 16: 313–340.

Amount of Growth:

The culture produces a well-developed and branched substrate mycelium and characteristic abundant powdery aerial mycelium on many media. Colonies are raised, edges undulate. Generally growth is finely granular to coarse, occasionally smooth in center (Bennett agar). Sectoring with "fairy rings" is observed on a few media.

Vegetative Mycelium and Spore Color:

After two days growth on ISP-2, asparagine and Amidex media, spores en masse are sandy-buff and ivory color, remaining buff even after 10 days. Reverse or vegetative mycelium yellow to orangy yellow to light brown.

Morphology:

Long filamentous mycelium. Sporophores, long and short, up to 50 spores per chain, with a mixture of straight and flexuous (RF group-Pridham). No spirals. Sporophores branching irregularly often entangled and forking at terminal points or arising as multiple forming clusters. As observed by electron microscopy at magnifications up to 50,000, spores are elongate, cylindrical, smooth to slightly rugose with a sheath, and measure 0.6 × 0.4 to 1.0 × 0.5 microns in size.

Physiology:

Soluble Pigment:

Traces to moderate amount of pigment are produced after 4 days on some media, such as asparagine, Bennett, Emerson, yeast extract-malt extract (ISP-2), milk and gelatin, but not on ISP media 3, 4 and 5 or Amidex, Pablum, tomato agar, tomato-oatmeal, tomato-soyflour or Sp. 5 (ATTC No. 5). However, after 11 days, brown-black pigment is secreted on Sp. 5, Amidex, tomato-oatmeal, Pablum agars.

Reverse Colors:

These vary according to the medium used for growth, running from white to buff with no black (as in Pablum, ISP-3, ISP-5, and tomato agar) to smoky-grey to black (as in Sp. 5, Amidex, Asparagine, Bennett, tomato-oatmeal and Emerson agars) after 11 days at 28°.

Miscellaneous Physiological Reactions:

The culture is highly chromogenic (produces melanin) on peptone-iron medium but less so on tyrosin agar. Starch is hydrolyzed and gelatin is liquified partly after only 4 days. Growth is good on milk, with moderate peptonization. The culture grows well at 28°C., producing a colorless exudate after 11 days on many media (e.g., Sp. 5, Amidex, asparagine, Bennett, Emerson, Pablum, tomato, tomato-soy). The culture grows well at 28°C. and 35°C. but does not grow at 45°, 47° and 50°C.

Based on spore ornamentation, general morphology of spores and the branching of sporophores, the colors en masse on various media and certain biochemical and physiological reactions, it is concluded that Streptomyces sp. X-11085 is different from any of the cultures of the RF group described in the literature.

Cultivation of the organism Streptomyces sp. X-11085 to produce the compound of formula I may be carried out utilizing a variety of fermentation techniques. In general the following basic techniques can be employed in both flask and tank procedures.

In the flask fermentation, a loopful of spores from an agar slant of the culture is inoculated into 100 ml. of nutrient medium in a 500 ml. Erlenmeyer flask and incubated at about 28°C. on a rotary shaker for up to 3 days. The inoculum nutrient medium contains a nitrogen source, preferably selected from an acid or enzyme hydrolyzed protein source such as enzyme hydrolyzed milk products, enzyme hydrolyzed bean meal products and the like, a carbohydrate source such as glucose; and inorganic salts such as phosphates, sodium chloride, and the like. Trypticase soy broth prepared by the Baltimore Biological Laboratories is the preferred inoculum medium. After incubation in the inoculum medium for up to three days small samples of the broth are transferred to the culture medium where they are incubated at about 28°C. on a rotary shaker for from about 1 to 5 days. Whole broth samples are aseptically removed periodically for in vitro assays, usually every second day. For preparation of larger volumes of broth, inoculum is first prepared in 6 liter Erlenmeyer shakeflasks or in 5-gallon pyrex bottles, fitted for aeration, sampling etc. This broth is then transferred to the tank fermentors. Aeration in bottles and tanks is provided by forcing sterile air through the fermenting medium. In tanks, further agitation is provided by mechanical impellers. Antifoam agents such as lard oil, soybean oil, silicone surfactants, etc. are added as needed to control foam.

Streptomyces sp. X-11085 may be cultured in a variety of liquid culture media. Media which are especially useful for the production of compound of formula I include an assimilable carbon source such as starch, glucose, molasses and the like, an assimilable nitrogen source such as protein, protein hydrolysate, polypeptides, amino acids, corn steep liquor, ammonium salts, and inorganic cations and anions, such as potassium, sodium, calcium, magnesium sulfate, phosphate, chloride, etc. Trace elements such as cobalt, copper, iron, molybdenum, boron, etc., are supplied as impurities of other constituents of the media.

A number of carbon sources which permit good growth and production include, for example, glucose, glycerol, dextrin and corn starch. In addition to the inorganic salts already present in natural media, supplementation with salts such as potassium phosphate, calcium carbonate, magnesium sulfate and trace elements will sometimes increase growth and antibiotic yield (depending on the constituents already present in the basal medium). One of the preferred media for production of the compound of formula I in large fermenters contains in grams per liter: glucose 10.0, enzyme hydrolyzed protein such as Bacto peptone prepared by Difco 5.0; yeast extracts such as Bacto yeast extract prepared by Difco 3.0; and $Fe(NH_4)_2(SO_4)_2 \cdot 6H_2O$ 0.031.

After fermentation is complete a variety of procedures can be employed for the isolation and purification of the compound of formula I. Suitable isolation and purification procedures include ion exchange chromatography, partition chromatography and adsorption chromatography.

In a preferred aspect, the compound of formula I is recovered from the culture medium by separation of the mycelium and any undissolved solids from the fermentation broth by conventional means, such as by filtration or centrifugation. The compound of formula I is then separated from the filtered or centrifuged broth using either ion exchange chromatography or adsorption chromatography. The adsorption chromatography procedure is preferably effected by adsorption of impurities onto a charcoal such as Norite A. The ion exchange chromatography can be performed using either a hydrogen form or an alkali metal ion form, i.e., the sodium form, of an ion exchange resin. The partition chromatography is preferably effected using a silica gel support and an alcohol/water/ammonia solvent. It is of course understood that the isolation and purification of the compound of formula I can be accomplished using a combination of any of the above described techniques.

After filtration or centrifugation of the fermentation medium, thin layer or paper chromatography techniques can be employed to analyze for the compound of formula I. Because of the chemical characteristics of said compound, visualization of the spots can be achieved using ninhydrin spray. In addition, bioautography can also be employed advantageously. The chromatography may be carried out on paper but is preferably performed on silica gel glass plates or on cellulose plates. The solvent system employed for thin layer chromatograms consists of ethanol/$H_2O$/$NH_3$, 49/49/2 when silica gel plates are employed and phenol/$H_2O$, 80/20, when cellulose plates are employed. In the final crystallization, the compound of formula I can be obtained as a zwitterion or as its mono- or di-acid salt, for example, as its mono- or di-hydrochloride.

The novel compound of formula I above forms acid addition salts with organic or inorganic acids. Suitable inorganic acids include, for example, the hydrohalic acids such as hydrochloric acid and hydrobromic acid, other mineral acids such as sulfuric acid, phosphoric acid, nitric acid and the like. Suitable organic acids include, for example, tartaric acid, citric acid, acetic acid, formic acid, maleic acid, succinic acid and the like. While these and the zwitterion form possess equal activity, solutions of the salts, especially the monohydrochloride, are considerably more stable and are therefore preferred. For this reason, it is preferable to use slightly acid conditions for purification.

The post-emergence herbicidally active compositions of the invention contain L-trans-2-amino-4-(2-aminoethoxy)-3-butenoic acid as the active ingredient in combination with carrier materials commonly recognized in the art as herbicidal carrier materials or adjuncts. Such agents include modifiers, diluents or conditioning agents to facilitate the formulation of solutions, emulsions, dispersions, dusts or wettable powders.

Liquid formulations of L-trans-2-amino-4-(2-aminoethoxy)-3-butenoic acid or an acid addition salt thereof in accordance with the invention for direct spraying may be made, for example, with water, petroleum fractions, liquid aliphatic or aromatic alcohols, esters, glycols or ketones and the like. These liquid formulations can be solutions, dispersions, emulsions or wettable powder dispersions and, if needed, may contain surface active agents, e.g., wetting agents, dispersing agents, emulsifying agents and the like, in sufficient amounts to impart the desired characteristics to the formulation.

Aqueous formulations, for example, can be made by forming solutions of the non-toxic water soluble salts of the compound of formula I or by adding water to emulsion concentrates, pastes or wettable spray powders thereof. The wetting, emulsifying or dispersing agents may be either anionic, cationic, non-ionic or mixtures thereof. Suitable wetting agents are the organic compounds capable of lowering the surface tension of water and include the conventional soaps such as the water-soluble salts of long-chain carboxylic acids; and amine soaps, such as amine salts of long-chain carboxylic acids, the sulfonated animal, vegetable and mineral oils, quaternary salts of high molecular weight acids; rosin soaps such as salts of abietic acid, sulfuric acid salts of high molecular weight organic compounds; algin soaps; and simple and polymeric compositions having both hydrophobic and hydrophilic functions.

Dusts may be prepared by mixing or grinding of the active substance with a solid carrier material such as talc, diatomaceous earth, kaolin, bentonite, calcium carbonate, boric acid, calcium phosphate, wood, flour, cork dust, carbon and the like. Scatterable granules may be obtained, for example, by using ammonium sulfate as carrier material. Alternatively, carrier materials may be impregnated with solutions of the active substances in liquid solvents. Powder preparations or pastes which can be suspended in water and used as sprays may be obtained by adding wetting agents and protective colloids. Different forms of application may be better adapted to the various purposes for which the active substances are to be used by the addition of substances which improve dispersion, adhesion, resistance to rain, and penetrative power such as fatty acids, resins, wetting agents, emulsifying agents, glue and the like. Similarly, the biological spectrum may be broadened by the addition of substances having bacteriocidal, fungicidal and plant growth regulating properties and also by combination with fertilizers.

The amount of active ingredient in the herbicidal compositions of this invention varies according to the application rates, type of application and activity required. Generally, the compositions contain less than 50 percent active compound by weight.

In order to achieve the greatest post-emergence herbicidal activity, application of a sufficient amount of the compositions of the invention to yield from about ¼ pound to about 4 pounds, preferably from about 1 to about 2 pounds of active ingredient per acre is contemplated. It will be appreciated that the amount of the compound of formula I to be applied will depend on the type of undesirable vegetation to be controlled as the effectiveness thereof varies from species to species.

The active ingredient of the herbicidal compositions of the invention is prepared in accordance with the following examples in which all temperatures are given in degrees Centigrade unless otherwise noted.

EXAMPLE 1

Fermentation of Streptomyces sp. X-11085

A spore suspension of Streptomyces sp. X-11085 from a nutrient agar test tube slant was inoculated into a 6 liter Erlenmeyer flask containing 2 liters of Trypticase soy broth (Baltimore Biological Laboratories). The flask was incubated at 28° for 72 hours on a rotary shaker (240 rpm with a 2 inch stroke). Four liters of this inoculum was then added to 227 liters of fermentation medium containing in g/liter:

| Cerelose CPC International | 10.0 |
| --- | --- |
| Bacto-Peptone (Difco) | 5.0 |
| Bacto-yeast extract | 3.0 |
| Ferrous ammonium sulfate-hexahydrate | 0.03 |

The pH of the medium was adjusted to 6.8 with sodium hydroxide before sterilization. The culture was incubated at 28° in a 380 liter fermentor, aerated at 85 lpm and agitated at 200 rpm. A silicone antifoam agent, Dow Corning AF, was added as needed to control frothing. After 41 hours the contents of the fermentor were filtered by centrifugation through infusorial earth.

EXAMPLE 2

Purification of L-trans-2-amino-4-(2-aminoethoxy)-3-butenoic acid

426 Liters of filtered fermentation broth, obtained as described in Example 1, which contained 3.1 kg of solids was passed through a 12 inch diameter column which contained 50 L Dowex 50WX4 resin (50–100 mesh in the $H^+$ form). The column was successively washed with:

1. 50 l $H_2O$;
2. 200 l 5 percent aqueous pyridine solution;
3. 50 l $H_2O$. The active material was then eluted with 200 l of 1.0M $NH_4OH$ in aqueous solution. The first 80 liters of eluate obtained after the pH of the eluate rose above 9.0 contained almost all of the active material. The active fractions were evaporated at reduced pressure to a 2 l. concentrate which contained 64 g solids. The pH of the concentrate was adjusted to 3.3 with 5N HCl solution as 340 g of Norite A charcoal was suspended in the concentrate. The suspension was then filtered through a sintered glass funnel containing a celite Hyflo pad on top of which was layered an additional 70 g of Norite A charcoal. A combined volume of 5 l of filtrate and water wash of the cake contained essentially all of the active material (42 g of solids). After evaporation at reduced pressure a 31 ml portion of the concentrate which contained 18 g of solids was diluted with 65 ml. of solvent - ethanol/$H_2O$/$NH_4OH$: 85/15/5 and this solution was applied to a column 90cm × 8cm i.d. which contained 4.7 l Merck silica gel, 0.05–0.2 mm, previously slurried in a solvent consisting of ethanol/$H_2O$/$NH_4OH$: 85/15/5. The column was then developed with the same solvent and the activity was found in a 4.8 l fraction which appeared after 12 l of solvent had passed through the column. The active fraction was concentrated to 200 ml and the concentrate passed through 50 ml AG50WX4 resin (50–100 mesh in the $H^+$ form). After washing the column with water and 10 percent aqueous pyridine solution, the activity was eluted with 1.5 M $NH_4OH$ solution. This eluate was concentrated to 80 ml and the pH adjusted to 3.3 with 7.4 ml 1 N HCl solution. The solution was further concentrated to a syrup and crystallization was effected from 20 ml methanol-water (19/1) to yield L-trans-2-amino-4-(2-aminoethoxy)-3-butenoic acid hydrochloride. A second crop was crystallized from 20 ml methanol-$H_2O$ (49/1) m.p. 185°–186°, $[\alpha]_D^{25°}$ +85.8 (c, 1%, $H_2O$).

EXAMPLE 3

Purification of L-Trans-2-amino-4-(2-aminoethoxy)-3-butenoic acid

36 G of solids, partially purified using any combination of purification techniques including adsorption chromatography, partition chromatography and ion exchange chromatography were dissolved in 250 ml $H_2O$ and the pH of the solution was adjusted to 3.6 with 5N HCl. The solution was applied to a column, 60 cm × 7 cm id., containing 2.5 l AG50WX4 (100–200 mesh, $Na^+$ form) cation exchange resin. The column was eluted with 0.2M sodium phosphate-citrate buffer, pH 5.5, until the activity appeared in the eluate at an elution volume between 6.2 and 9.1 l. Salts were removed from the active fraction by passing the solution through 1.2 l AG50WX4 (50–100 mesh, H⁺ form) cation exchange resin. The activity was eluted from the column with 1.5N NH₄OH solution and after evaporation at reduced pressure L-trans-2-amino-4-(2-aminoethoxy)-3-butenoic acid hydrochloride was crystallized as described in Example 2.

EXAMPLE 4

Post-emergence herbicidal activity of the compositions of the instant invention is exemplified by the following tests against a variety of weeds. In the tests, the weeds were actively growing in 4 × 4 inch plastic cups and had attained a height of from about 1 ½ to about 4 inches depending on the species. Each cup contained only one plant species.

L-trans-2-amino-4-(2-aminoethoxy)-3-butenoic acid as the hydrochloride was applied to the plants in an aqueous vehicle containing 0.5 percent by weight polyoxyethylene sorbitan monostearate (Tween 20-Atlas Chemical Company, Wilmington, Del.). The active compound was dissolved in the vehicle in amounts sufficient to provide solutions yielding 0.5, 1.0, 2.0 and 4.0 pounds, respectively, per acre when applied to the weeds in a predetermined amount. The test solutions were applied to the plants in a single application with a belt sprayer and the plants were observed over a period of 14 days after which time the test was terminated and the results evaluated.

The results of the tests are provided in the following Table wherein the herbicidal injury rating is set forth numerically. The ratings code is as follows: 0-no visible effect; 1, 2, 3-slight injury, plant usually recovered with little or no reduction in top growth; 4, 5, 6-moderate injury, plants usually recovered, but with reduced top growth; 7, 8, 9-severe injury, plants usually did not recover; 10-all plants killed.

TABLE

Herbicidal Activity of L-Trans-2-amino-4-(2-aminoethoxy)-3-butenoic acid
14 days

| Concentration Lbs/Acre | Cocklebur | Yellow Nutsedge | Johnson-grass | Jimson-weed | Canada Thistle | Purple Nutsedge |
|---|---|---|---|---|---|---|
| 4.0 | 9 | 7 | 9 | 8 | 5 | 4 |
| 2.0 | 8 | 5 | 8 | 8 | 4 | 2 |
| 1.0 | 8 | 4 | 8 | 6 | 1 | 0 |
| 0.5 | 6 | 2 | 7 | 4 | 1 | 0 |

| Concentration Lbs/Acre | Teaweed | Coffee-weed | Lambs-quarter | Quack-grass | Cheat-grass | Velvet Leaf |
|---|---|---|---|---|---|---|
| 4.0 | 8 | 6 | 5 | 2 | 6 | 7 |
| 2.0 | 7 | 3 | 3 | 1 | 4 | 4 |
| 1.0 | 5 | 4 | 1 | 0 | 2 | 2 |
| 0.5 | 4 | 2 | 0 | 0 | 2 | 2 |

We claim:

1. A method of controlling undesirable plants by postemergent treatment which comprises applying to said plants a herbicidally effective amount of a composition comprising a herbicidal adjunct and, as the active ingredient, a herbicidally effective amount of a compound selected from the group consisting of L-trans-2-amino-4-(2-aminoethoxy)-3-butenoic acid and acid addition salts thereof.

2. A method of controlling undesirable plants by postemergent treatment which comprises applying to said plants a herbicidally effective amount of the composition of claim 1 wherein said acid addition salt is the hydrochloride.

* * * * *